Jan. 19, 1954  E. F. BRUNING  2,666,656
BREAKAWAY COUPLING FOR FLUID CONDUITS
Filed Dec. 20, 1950  2 Sheets-Sheet 1
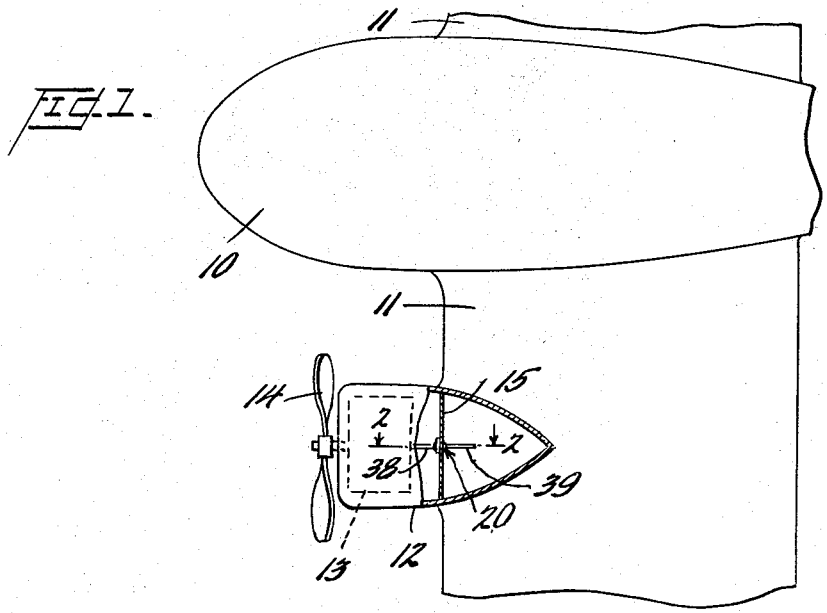
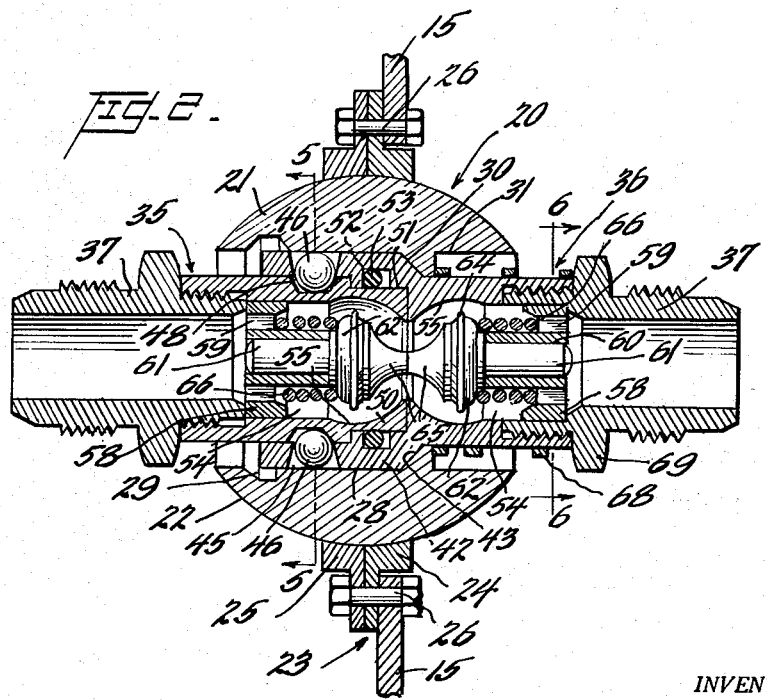
INVENTOR.
Earl F. Bruning,
BY
Parker and Walsh
ATTORNEYS

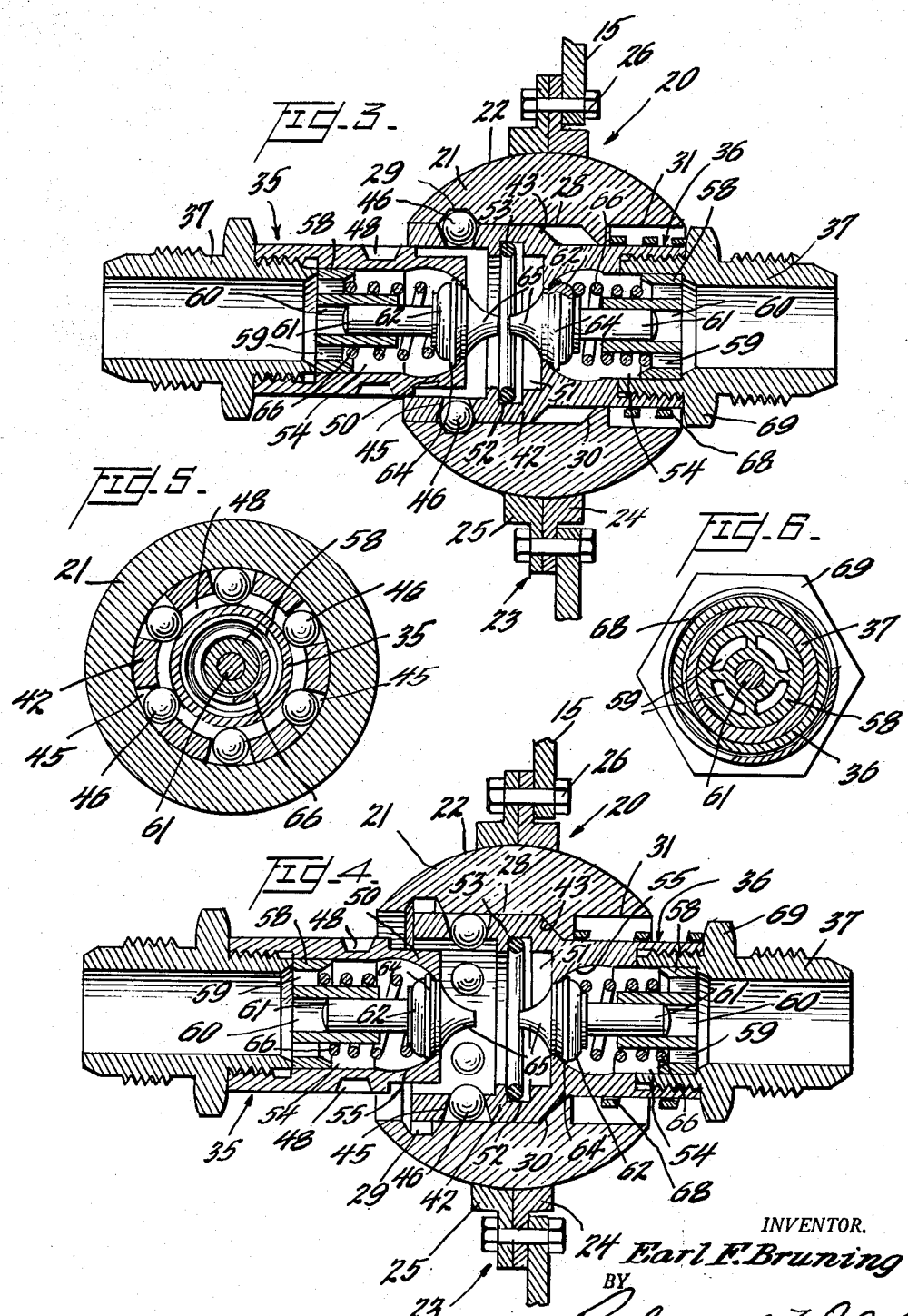

Patented Jan. 19, 1954

2,666,656

UNITED STATES PATENT OFFICE 2,666,656

BREAKAWAY COUPLING FOR FLUID CONDUITS

Earl F. Bruning, Lincoln, Nebr.

Application December 20, 1950, Serial No. 201,745

3 Claims. (Cl. 285—35)

This invention relates to a fluid conduit coupling, and more particularly to an automatic break-away coupling for use in installations where elements or mechanisms between which the fluid conduit extends are subject to possible unintentional disconnection.

In my prior patent, No. 2,512,999, granted June 27, 1950, I have disclosed a novel type of fluid coupling which possesses substantial advantages over prior structures in numerous ways, such as ease of coupling and uncoupling, minimum interference with the flow of fluid when the device is coupled, etc. In order to uncouple the elements, a sleeve is moved axially against the tension of a spring to release locking balls which normally connect the coupling nipples with the locking sleeve. This arrangement of parts and the control means therefor is highly advantageous in most installations where a coupling of this character is used.

In certain other installations, it is highly desirable to provide a coupling which is automatically disconnected under certain conditions. For example, in many farm implement power combinations, a tractor is connected through a suitable hitch with a following implement having parts adapted to be controlled hydraulically from the driver's seat of the tractor, and to this end, a hose coupling is provided to convey hydraulic fluid to the implement. In such installations, there is always danger of disconnection of the tractor from the implement due to failure of the hitch in some manner or due to overloading of the hitch, for example when a plow strikes an obstruction, and when this occurs, there is inevitable breakage of the fluid line.

In aircraft structures, it is the common practice to install a fire wall in a nacelle rearwardly of the engine to act as a fire stop in the event the engine catches fire. The fuel supply line for the engine extends through such fire wall, and in the occasional cases wherein engines tear loose from their mountings, the fuel lines are ripped out and fuel flows from the source through the pipe line and constitutes an extremely serious fire hazard.

An important object of the present invention is to provide a novel type of coupling which, when the parts thereof are in coupling engagement, provides for the free flow of fluid therethrough, but which, upon the transmission of a pulling force incident to the disconnection of the units or mechanisms to which the fluid conduit is connected, is automatically released to disconnect the coupled conduits without damage to the coupling or the pipe lines, and wherein the previously coupled conduits are instantly sealed to prevent the flow of fluid therefrom.

A further object is to provide a novel coupling of the character referred to having a coupling sleeve or corresponding unit fixed against axial movement with relation to the structure by which it is carried, and which is so constructed and arranged with relation to the other coupling elements that when a pull is exerted on one of the coupled conduits, the two conduits are substantially instantly fully disconnected and closed against loss of fluid therefrom.

A further object is to provide a coupling of the type referred to wherein the coupling sleeve structure or the like is mounted with respect to the supporting structure, which fixes it against axial movement, in such manner as to provide for its universal movement, thereby particularly adapting the structure for use in an airplane engine nacelle so that in the event an engine tears loose, the locking sleeve member of the coupling is adapted to swing in accordance with the direction of pull of the engine as it tears loose from its mountings, thus insuring the transmission of an endwise pull to the fluid line leading to the engine, whereby the coupling will be instantly disconnected and the conduit sections closed against loss of fluid, thereby eliminating a serious fire hazard.

Other objects and advantages of the present invention will become apparent during the course of the following description.

In the drawings, I have shown one embodiment of the invention. In this showing,

Figure 1 is a fragmentary plan view of a portion of an airplane, parts being broken away and parts being shown in section generally to indicate the mounting of the present device in the fire wall of the engine nacelle, Figure 2 is a fragmentary sectional view taken substantially on line 2—2 of Figure 1, showing a portion of the fire wall, and pipes leading to the coupling being omitted and the parts of the device being shown in fully coupled relation, Figure 3 is a similar view taken with the movable parts shifted toward the left and with the locking balls moved to a releasing position and with the fluid valves closed, the left hand coupling nipple being free for complete disconnection from the rest of the structure, Figure 4 is a similar view with the locking balls released from the groove in the supporting sleeve and with the left hand nipple returned to normal position, Figure 5 is a section on line 5—5 of Figure 2, and Figure 6 is a similar view on line 6—6 of Figure 2.

Referring to Figure 1, the numeral 10 designates the fuselage of a conventional airplane having the usual wings 11, each provided with at least one engine nacelle. One such nacelle is shown in Figure 1 and indicated by the numeral 12, and in such nacelle, a conventional engine is diagrammatically shown in dotted lines and indicated by the numeral 13 and connected to a conventional propeller 14. Within the nacelle is arranged a fire wall 15, the normal purpose of which is to prevent the spread of fire in the event the engine catches fire, as occasionally happens.

In the use of the present invention in airplanes, the fire wall 15 is used as the supporting means for the coupling, indicated as a whole by the numeral 20. It will become apparent that for other installations, such as with tractor-implement combinations, the member 15 may be a supporting bracket rigidly connected to the tractor or to the implement, depending upon which conduit section is to be released, as will become apparent below.

In the embodiment of the invention illustrated, the coupling comprises a control sleeve 21 shown as having its outer surface 22 formed as a section of a sphere arranged in a socket 23 formed of complementary sections 24 and 25 bolted as at 26 to the fire wall 15. It will be apparent that the sleeve 21 is free to rock on the center of the spherical surface 22 while being fixed against all movements except such rocking movement.

The sleeve 21 is provided with an axial bore 28 with which communicates an annular internal groove 29 having radially inwardly diverging end walls for a purpose to be described. This groove is arranged adjacent the left hand end of the bore 28 is viewed in Figure 2, and at the opposite end of such bore is formed a tapered positive positioning shoulder 30 for a purpose to be described. To the right of such shoulder, the sleeve 21 is provided with a second axial bore 31 for a purpose to be described.

The elements to be coupled comprise two nipples indicated as a whole respectively by the numerals 35 and 36. These nipples are provided with fittings 37 threaded therein for connection through suitable coacting union members with pipe or conduit sections 38 and 39 (Figure 1). The nipple 36 is of an external diameter adapted to slide within the minor diameter of the shoulder 30. To the left of such shoulder, the nipple 36 is annularly enlarged as at 42 to slidably fit within the bore 28. Such enlarged portion of the nipple 36 has its right hand end, as viewed in Figure 2, tapered as at 43 to provide a shoulder engageable with the shoulder 30. The enlargement 42, intermediate its ends, is provided with circumferentially spaced radially outwardly tapered openings 45 each receiving a locking ball 46 of slightly larger diameter than the minimum diameter of the openings 45. The balls 46 are adapted under conditions and for a reason to be described to move radially outwardly into the groove 29. In the normal position of the parts, when coupled, the balls 46 are engageable in a radially outwardly tapered annular groove 48 formed in the outer surface of the nipple 35. With the balls 46 arranged as shown in Figure 2, the nipples 35 and 36 are fixed against axial movement with respect to each other.

The nipple 35 slidably fits within the adjacent end of the enlargement 42. The inner end of the nipple 35 is reduced as at 50 axially to fit within a reduced bore 51 in the enlargement 42. The adjacent portion of such enlargement is provided with an internal groove 52 in which is arranged an O-ring 53 to seal against fluid leakage between the nipples when the device is coupled, as will be apparent.

Each nipple is provided with an internal bore 54, the inner extremity of which curves inwardly as at 55 to form a valve seat in a manner to be described. Within this bore 54 is arranged a valve cage 58 having fluid passages 59 therethrough and provided with an axial guide opening 60 for a valve stem 61. A valve element 62 is carried by each stem 61 and is provided with an O-ring 64 forming a valve element engageable with the associated seat 55. Each valve 62 is provided with an axial projection 65, and the projections of the two valves are engageable with each other when the device is coupled to maintain the valve elements 64 off their seats against the tension of compression springs 66.

A compression spring 68 has one end seated against the inner extremity of the bore 31 and has its opposite end engaging the nut 69 of the associated fitting 37. This spring obviously functions to urge the nipple 36 and associated elements toward the right to maintain the parts in their normal coupling positions as shown in Figure 2.

*Operation*

In assembling the coupling, the socket members 24 and 25 obviously are brought into position from opposite ends of the sleeve member 21, whereupon they are secured together and fixed to the support 15 by the bolts 26. The support 15 in the case of an airplane engine fuel line will be the fire wall shown in Figure 1. In a towed equipment installation, the member 15 will be a stationary bracket or the like, carried either by the tractor or the implement vehicle.

As will become apparent below, the mounting shown in Figure 2 is such that if the fitting of the nipple 35 leads to the tractor, the support 15 will be connected to the implement vehicle. If the fitting 37 of the nipple 36 is to be connected to the tractor, the support 15 will be fixed to the tractor so that upon disconnection of the implement vehicle from the tractor by accident, the resultant pull on the nipple 35 will disconnect the parts. In the case of the airplane installation shown in Figure 1, the support 15 will be the fire wall, the pipe 39 from the fitting 37 of the nipple 36 will lead to the source of fuel supply, while the pipe 38 will lead to the engine so that if the latter tears loose from its mounting, the pull transmitted by the pipe 38 to the nipple 35 will uncouple the parts, and this operation is described in detail below.

In assembling the coupling elements, the nipple 36 is inserted through the sleeve member 21 from the left end thereof as viewed in Figure 2, the shoulders 30 and 43 being brought into engagement with each other. The coil spring 68 is then slipped over the nipple 36, whereupon the fitting 37 with the cage 58, valve 62 and spring 66 in position therein, is screwed into the nipple 36. When these parts are assembled, the spring 68 will be loaded, thus tending resiliently to hold the shoulder 43 in engagement with the shoulder 30.

It will be apparent that when the nipple 36 is inserted in the manner stated, the balls 46 will be in position in the openings 48 and the O-ring 53 will be in position in the annular groove 52. The main parts of the device are then completely assembled ready for the coupling of the nipple 35. The elements of this nipple are assembled in a manner which will be obvious, and prior to the coupling of the nipples, both valves 62 will be closed as shown in Figure 4. The nipple 35 is coupled with respect to the nipple 36 merely by sliding it axially to the right as viewed in Figure 2 while forcing the nipple 36 to the left to bring the balls 46 into registration with the groove 29. The shoulder at the left hand end of the reduced nipple portion 51, under such conditions, moves the balls 46 outwardly into the groove 29, whereupon the nipple 35 may be moved to the right to align the grooves 29 and 48 transversely. The balls 36 are then free to move radially inwardly to clear the groove 29, whereupon the nipples 35 and 36 are free to move to the right as a unit to the fully coupled position shown in Figure 2.

During such coupling movement, the point will be reached in which the axial projections 65 of the valves contact with each other, and thereafter the completing of the coupling operation unseats the valves 62, thus providing for the free passage of fluid through the coupling. In the case of an airplane installation as shown in Figure 1, the parts remain coupled and fuel flows from right to left as viewed in Figures 1 and 2 to the engine 13. In the event of the accidental loss of an engine due to its breaking loose from its mountings, a pull will be exerted on the pipe section 38 and this pull will be transmitted through the associated fitting 37 to the nipple 35. In the event this pull is not in direct alignment with the axis of the device with the parts positioned as shown in Figure 2, the angularity of the pull will result in the swinging of the coupled elements and the sleeve member 21 whereby the coupled elements will assume positions in axial alignment with the line of pull transmitted to the nipple 35.

Upon the occurrence of such a pulling force, the nipple 35 will move to the left and its movement will be transmitted through the balls 46 and the walls of the openings 45 to effect movement of the nipple 36 to the left against the tension of the spring 68. This movement of the nipple 36 continues until the balls become transversely aligned with the groove 29, whereupon the sloping right hand sides of the openings 45, as viewed in Figure 2, will cam the balls 46 outwardly into the grooves 29, thus unlocking the nipple 35 from the nipple 36, as shown in Figure 3. Slight continued movement of the nipple 35 to the left, for example as shown in Figure 3, releases the valves 62 for movement to closed position by the springs 66. Both pipes 38 and 39 accordingly will be closed against loss of fluid, thus substantially eliminating the usually existing fire hazard in an accident of this type.

After the nipples have been released, the nipple 35 continues its free movement to the left as in Figure 4 and it will be wholly disconnected from the coupling device and free to move with the engine. The spring 68 then snaps the nipple 36 back to its normal position as shown in Figure 4 with the shoulders 30 and 43 in engagement with each other. Thus the fuel line 39 will be automatically cut off and all openings through the fire wall 15 sealed, and accordingly, it will be apparent that the present invention provides a materially increased factor of safety in the operation of airplanes.

The O-rings 64 carried by the valves form effective liquid seals when in engagement with their seats 55, while the O-ring 53 prevents any loss of fluid due to seepage between the inner ends of the nipples 35 and 36. In the normal operation of the parts as shown in Figure 2, therefore, the valves 62 are maintained open for the free flow of liquid through the coupling, and any negligible leakage of liquid which otherwise would occur is prevented by the O-ring 53. The engaging surfaces of the parts are preferably accurately machined so that any leakage which would occur in the absence of the O-ring 53 in any event would be negligible.

The operation of automatically uncoupling the parts in other installations, such as the use of the coupling for hydraulic lines between tractors and farm implements, will be the same as described above. Assuming that a tractor hitch connecting the vehicles accidentally becomes uncoupled or breaks, thus releasing the tractor from the implement vehicle, the exertion of a pull on the nipple 35 will instantly result in the uncoupling of the elements in the manner described above. In a tractor-implement combination, it usually is unnecessary to universally support the sleeve member 21, in which case the members 24 and 25 can be considered integral with the sleeve member and suitably connected to the support 15. The universal mounting is preferred, however, to positively assure the uncoupling of the parts under conditions such as those described, if the pulling force transmitted to the nipple 35 is not in exact alignment with the axis of the device in its normal position.

I claim:

1. In combination with an engine nacelle, a fire wall in said nacelle having an opening, a coupling structure completely filling said opening, said coupling structure comprising a sleeve, means mounting said sleeve for universal movement in said opening, a pair of telescoped nipples in sealing relation axially slidable in said sleeve and occupying normal positions relative to each other and relative to said sleeve in fluid-flowing relation, said nipples being adapted for connection with pipe sections for the flow of fluid therethrough, locking means fixing said nipples against relative axial movement when in said normal positions, means for releasing said locking means from one of said nipples upon the transmission of a pull thereto moving said nipples in a direction away from their normal positions relative to said sleeve, a normally open valve in the other of said nipples, and means automatically closing said valve when said nipples are disconnected.

2. In combination with an engine nacelle, a fire wall in said nacelle having an opening, a coupling structure completely filling said opening, said coupling structure comprising a sleeve, means mounting said sleeve for universal movement in said opening, a pair of telescoped nipples in sealing relation axially slidable in said sleeve and occupying normal positions relative to each other and relative to said sleeve in fluid-flowing relation, said nipples being adapted for connection with pipe sections for the flow of fluid therethrough, locking means fixing said nipples against relative axial movement when in said normal positions, means for releasing said locking means from one of said nipples upon the transmission of a pull thereto moving said nipples in a direction away from their normal positions relative to said sleeve, normally open valves in said nipples, and means automatically closing said valves when said nipples are disconnected.

3. In combination with an engine nacelle, a fire wall in said nacelle having an opening, a coupling structure completely filling said opening, said coupling structure comprising a support mounted in said opening and secured to said fire wall and provided with an internal surface formed as a section of a sphere, a sleeve having an external spherical surface fitting within said support to be universally supported thereby, a pair of telescoped nipples in sealing relation axially slidable in said sleeve and occupying normal positions relative to each other and relative to said sleeve in fluid-flowing relation, said nipples being adapted for connection with pipe sections for the flow of fluid therethrough, locking balls fixing said nipples against relative axial movement when in said normal positions, means for releasing said balls from one of said nipples upon the transmission of a pull thereto moving said nipples in a direction away from their normal positions relative to said sleeve, normally open valves in said nipples, and means automatically closing said valves when said nipples are disconnected.

EARL F. BRUNING.

References Cited in the file of this patent

UNITED STATES PATENTS

| Number | Name | Date |
|---|---|---|
| 783,301 | McMillan | Feb. 21, 1905 |
| 2,255,333 | Scheiwer | Sept. 9, 1941 |
| 2,326,143 | Hufferd | Aug. 10, 1943 |
| 2,386,270 | Samiran | Oct. 9, 1945 |
| 2,414,509 | Crot | Jan. 21, 1947 |
| 2,453,741 | Bopp | Nov. 16, 1948 |
| 2,471,118 | Patterson | May 24, 1949 |
| 2,512,999 | Bruning | June 27, 1950 |